United States Patent
Kaushik (10) Patent No.: US 12,441,199 B2
(45) Date of Patent: Oct. 14, 2025

(54) MOTOR OUTPUT CONTROL SYSTEM

(71) Applicant: Zimeno Inc., Livermore, CA (US)

(72) Inventor: Karan Kaushik, Fremont, CA (US)

(73) Assignee: Zimeno Inc., Livermore, CA (US)

( * ) Notice: Subject to any disclaimer, the term of this patent is extended or adjusted under 35 U.S.C. 154(b) by 0 days.

(21) Appl. No.: 18/389,185

(22) Filed: Nov. 13, 2023

(65) Prior Publication Data

US 2024/0181898 A1    Jun. 6, 2024

Related U.S. Application Data

(60) Provisional application No. 63/524,849, filed on Jul. 3, 2023, provisional application No. 63/429,175, filed on Dec. 1, 2022.

(51) Int. Cl.
*B60L 50/16* (2019.01)
*B60K 17/28* (2006.01)
*B60K 25/06* (2006.01)
*B60W 10/08* (2006.01)

(52) U.S. Cl.
CPC ............. *B60L 50/16* (2019.02); *B60K 17/28* (2013.01); *B60K 25/06* (2013.01); *B60W 10/08* (2013.01); *B60K 2025/065* (2013.01); *B60L 2240/421* (2013.01); *B60L 2240/423* (2013.01)

(58) Field of Classification Search
CPC ............. B60L 50/16; B60L 2240/421; B60L 2240/423; B60L 1/003; B60K 17/28; B60K 25/06; B60K 2025/065; B60W 10/08
See application file for complete search history.

(56) References Cited

U.S. PATENT DOCUMENTS

| | | | |
|---|---|---|---|
| 4,844,685 A | 7/1989 | Sagaser | |
| 5,297,916 A | 3/1994 | Fujikawa et al. | |
| 6,052,647 A | 4/2000 | Parkinson et al. | |
| 7,229,139 B2 | 6/2007 | Lu et al. | |
| 8,306,697 B2 | 11/2012 | Lu et al. | |
| 8,340,872 B2 | 12/2012 | Mintah et al. | |
| 10,046,641 B2 * | 8/2018 | Penmetsa | B60L 1/003 |
| 10,202,043 B2 * | 2/2019 | Kurple | H02J 7/14 |
| 10,286,892 B1 * | 5/2019 | Johri | B60W 10/26 |

(Continued)

FOREIGN PATENT DOCUMENTS

| | | | |
|---|---|---|---|
| CN | 106061784 A * | 10/2016 | B60K 17/28 |
| DE | 102020108968 A1 * | 10/2020 | B60K 6/26 |
| WO | 2022196242 A1 | 9/2022 | |

OTHER PUBLICATIONS

Ahamed et al. "Advancements of wave energy converters based on power take off (PTO) systems: A review." Ocean Engineering 204 (2020): 107248. Retrieved on Jan. 8, 2024 (Aug. 1, 2024) from entire document, 47 pages.

(Continued)

*Primary Examiner* — Drew J Brown
(74) *Attorney, Agent, or Firm* — Rathe Lindenbaum LLP (57) ABSTRACT

A motor output control system may include an electric motor, at least one powerline component powered by the electric motor and a controller. The controller is configured to monitor and determine a current output of the at least one powerline component and automatically output control signals adjusting output by the electric motor based upon an output of the at least one powerline component.

20 Claims, 4 Drawing Sheets

(56) References Cited

U.S. PATENT DOCUMENTS

| | | | |
|---|---|---|---|
| 10,601,219 B2* | 3/2020 | Czerny | G05B 19/0428 |
| 10,734,912 B2* | 8/2020 | Kaulmann | G01R 31/2829 |
| 10,816,063 B2* | 10/2020 | Spitz | F16H 7/1281 |
| 11,691,508 B1* | 7/2023 | Miele | B60K 25/02 |
| | | | 477/3 |
| 11,933,058 B2* | 3/2024 | Maini | B60K 6/24 |
| 2001/0019356 A1 | 9/2001 | Takeda et al. | |
| 2001/0044685 A1 | 11/2001 | Schubert | |
| 2009/0112423 A1 | 4/2009 | Foster et al. | |
| 2010/0206100 A1 | 8/2010 | Vyas et al. | |
| 2011/0031914 A1* | 2/2011 | Green | H02P 6/06 |
| | | | 318/400.11 |
| 2011/0224858 A1 | 9/2011 | Bissontz | |
| 2011/0231046 A1* | 9/2011 | Bissontz | B60K 6/46 |
| | | | 180/65.265 |
| 2012/0315120 A1 | 12/2012 | Hyder | |
| 2013/0249447 A1* | 9/2013 | Ishii | H02P 6/34 |
| | | | 318/400.01 |
| 2014/0055077 A1* | 2/2014 | Barrass | G05B 9/02 |
| | | | 318/700 |
| 2015/0176253 A1 | 6/2015 | Taylor et al. | |
| 2015/0275469 A1 | 10/2015 | Fredrickson et al. | |
| 2016/0273196 A1 | 9/2016 | Funk et al. | |
| 2018/0206392 A1 | 7/2018 | Matsuzaki | |
| 2018/0290592 A1 | 10/2018 | Stein et al. | |
| 2018/0297204 A1 | 10/2018 | Krasny et al. | |
| 2018/0373264 A1 | 12/2018 | Madsen et al. | |
| 2019/0084156 A1 | 3/2019 | Yasuda et al. | |
| 2019/0119087 A1 | 4/2019 | Fischbach et al. | |
| 2019/0276281 A1 | 9/2019 | Hofmeister et al. | |
| 2020/0071144 A1 | 3/2020 | Draayer et al. | |
| 2020/0131741 A1 | 4/2020 | Lehmann et al. | |
| 2020/0300691 A1 | 9/2020 | Bonthuis et al. | |
| 2020/0340213 A1 | 10/2020 | Zimmerman et al. | |
| 2020/0369498 A1 | 11/2020 | Ekshinge et al. | |
| 2021/0000013 A1 | 1/2021 | Robertson et al. | |
| 2021/0131072 A1 | 5/2021 | Gratton et al. | |
| 2021/0170947 A1 | 6/2021 | Yunus et al. | |
| 2021/0222743 A1 | 7/2021 | Whitney et al. | |
| 2021/0264624 A1 | 8/2021 | Fu et al. | |
| 2021/0301494 A1 | 9/2021 | Berry et al. | |
| 2021/0316617 A1* | 10/2021 | Pugh | H02P 9/008 |
| 2022/0106764 A1 | 4/2022 | Iwasaki et al. | |
| 2022/0120060 A1 | 4/2022 | Ready-Campbell et al. | |
| 2022/0126816 A1 | 4/2022 | Von Holst et al. | |
| 2022/0130063 A1 | 4/2022 | Thomas et al. | |
| 2022/0162048 A1 | 5/2022 | Meijer et al. | |
| 2022/0333344 A1 | 10/2022 | Kean et al. | |
| 2022/0350991 A1 | 11/2022 | Vesperman et al. | |
| 2022/0382274 A1 | 12/2022 | Kean et al. | |
| 2022/0412050 A1 | 12/2022 | Hoaby et al. | |

OTHER PUBLICATIONS

Bostelman et al. "Methods for improving visibility measurement standards of powered industrial vehicles." Safety science 62 (2014): 257-270. Retrieved on Jan. 15, 2024 (Jan. 15, 2024) from entire document, 14 pages.

International Search Report and Written Opinion for PCT/US2023/037158; mail date Jan. 23, 2024; 9 pages.

International Search Report and Written Opinion for PCT/US2023/037216; mail date Jan. 23, 2024; 15 pages.

International Search Report and Written Opinion for PCT/US2023/080816; mail date Feb. 12, 2024; 12 pages.

International Search Report and Written Opinion for PCT/US2023/081457; mail date Mar. 13, 2024; 7 pages.

International Search Report and Written Opinion for PCT/US2024/015857; mail date Jun. 21, 2024; 12 pages.

International Search Report and Written Opinion for PCT/US2024/015859; mail date Jun. 4, 2024; 8 pages.

International Search Report and Written Opinion for PCT/US2024/015860; mail date Jun. 4, 2024; 7 pages.

International Search Report and Written Opinion for PCT/US2024/015878; mail date May 20, 2024; 7 pages.

International Search Report and Written Opinion for PCT/US2024/020789; mail date Jul. 16, 2024; 6 pages.

* cited by examiner

MOTOR OUTPUT CONTROL SYSTEM

CROSS-REFERENCE TO RELATED APPLICATIONS

The present non-provisional application claims priority from U.S. provisional patent Application Ser. No. 63/429,175 filed on Dec. 1, 2022, by Karan Kaushik and entitled ADAPTIVE TORQUE LIMITING, and U.S. provisional patent Application Ser. No. 63/524,849 filed on Jul. 3, 2023, by Gatten et al. and entitled VEHICLE CONTROL, the full disclosures of which are hereby incorporated by reference.

BACKGROUND

Electric motors are often used to supply torque to various powerline components of a hybrid or electric vehicle. Examples of powerline components include, but are not limited to, a power takeoff (PTO), a traction or propulsion drive, and a hydraulic pump.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example motor output control systems, vehicles and methods that provide enhanced protection for powerline components of a vehicle. Powerline components are those components of a vehicle that are driven by torque from electric motor of the vehicle. Examples of powerline components include, but are not limited to, a power takeoff (PTO), a traction or propulsion drive, and a hydraulic pump. Each of such powerline components may have upper output limits that when exceeded may result in damage to the powerline component or other components connected to the powerline component. The example vehicle control systems, vehicles and methods monitor the output of each of the individual powerline components and automatically reduce the output of the electric motor that powers such powerline components such that each of the individual output limits are no longer exceeded to reduce the likelihood of damage to such powerline components.

In some implementations, certain powerline components may have lower output limits, wherein power output by the particular powerline component below such limits may result in damage to the particular powerline component or other components connected to the particular powerline component. In some implementations, the example vehicle control systems, vehicles and methods monitor the output of each of the individual powerline components and automatically increase the output of the electric motor that powers such powerline components such that each of the individual lower output thresholds are satisfied to reduce the likelihood of damage to such powerline components.

In some implementations, automatic increase or decrease of the output by the electric motor is iteratively and incrementally performed until none of the upper output limits is exceeded and each of the lower output limits or thresholds is satisfied. In some implementations the output of one or more of the powerline components that is monitored and determined as well as the corresponding upper and/or lower thresholds is in terms of torque. In some implementations, the output of one or more of the powerline components that is monitored and determined as well as the corresponding upper and/or lower thresholds is in terms of power. In some implementations, the monitored and determined output as well as the corresponding upper and/or lower thresholds is in terms of both torque and power. In some implementations, a combination of differently weighted torque and power values may be compared to a combined torque and power upper threshold and/or a combined torque and power lower threshold to determine when the output of the electric motor is to be adjusted.

In some implementations, the controller automatically adjusts the output by the electric motor based upon a combination of both a sensed or determined torque and a sensed power output of at least one powerline component. For example, the controller may automatically adjust output of the electric motor in response to a combination of the determined torque and sensed power output of a powerline component falling below a predetermined lower threshold or rising above a predetermined upper threshold, the lower threshold and the upper threshold both being established based upon a combination of torque and power output values that may damage the particular powerline component.

In some implementations, the determined torque value and the sensed power output by the at least one powerline component may be differently weighted. For example, the determined torque value of one or more of the powerline components may have a greater impact upon whether the controller proceeds with automatically adjusting the power output by the electric motor. In other implementations, the sensed power output by the one or more powerline components may have a greater impact upon whether the controller proceeds with automatically adjusting the power output by the electric motor.

In implementations where the output (torque and/or power output) of more than one powerline component is used to determine whether to automatically adjust the output of the electric motor, the output of the different powerline components may be differently weighted. Particular powerline components may be more expensive to repair or replace. Particular powerline components may be more susceptible to damage or may be more susceptible to more serious damage as compared to other powerline components. The output of those powerline components that are more expensive to repair or replace, that are more susceptible to damage or that are more susceptible to more serious damage may be given a greater weight when combined with the output of other powerline components to be compared to a predetermined lower or upper output threshold to determine whether to automatically adjust the output of electric motor. For example, in response to Powerline Component Output A*0.5+Powerline Output B*0.3+Powerline Component Output C*0.2>upper output threshold, the controller may automatically reduce the output of the electric motor, wherein the 0.5, the 0.3 and 0.2 are different weights applied to the different determined or sensed outputs of the powerline components.

For purposes of this application, the term "processing unit" shall mean a presently developed or future developed computing hardware that executes sequences of instructions contained in a non-transitory memory. Execution of the sequences of instructions causes the processing unit to perform steps such as generating control signals. The instructions may be loaded in a random-access memory (RAM) for execution by the processing unit from a read only memory (ROM), a mass storage device, or some other persistent storage. In other embodiments, hard wired circuitry may be used in place of or in combination with software instructions to implement the functions described. For example, a controller may be embodied as part of one or more application-specific integrated circuits (ASICs). Unless otherwise specifically noted, the controller is not limited to any specific combination of hardware circuitry and software, nor to any particular source for the instructions executed by the processing unit.

For purposes of this disclosure, unless otherwise explicitly set forth, the recitation of a "processor", "processing unit" and "processing resource" in the specification, independent claims or dependent claims shall mean at least one processor or at least one processing unit. The at least one processor or processing unit may comprise multiple individual processors or processing units at a single location or distributed across multiple locations.

For purposes of this disclosure, the term "coupled" shall mean the joining of two members directly or indirectly to one another. Such joining may be stationary in nature or movable in nature. Such joining may be achieved with the two members, or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

For purposes of this disclosure, the phrase "configured to" denotes an actual state of configuration that fundamentally ties the stated function/use to the physical characteristics of the feature proceeding the phrase "configured to".

For purposes of this disclosure, unless explicitly recited to the contrary, the determination of something "based on" or "based upon" certain information or factors means that the determination is made as a result of or using at least such information or factors; it does not necessarily mean that the determination is made solely using such information or factors. For purposes of this disclosure, unless explicitly recited to the contrary, an action or response "based on" or "based upon" certain information or factors means that the action is in response to or as a result of such information or factors; it does not necessarily mean that the action results solely in response to such information or factors.

Figure 1:
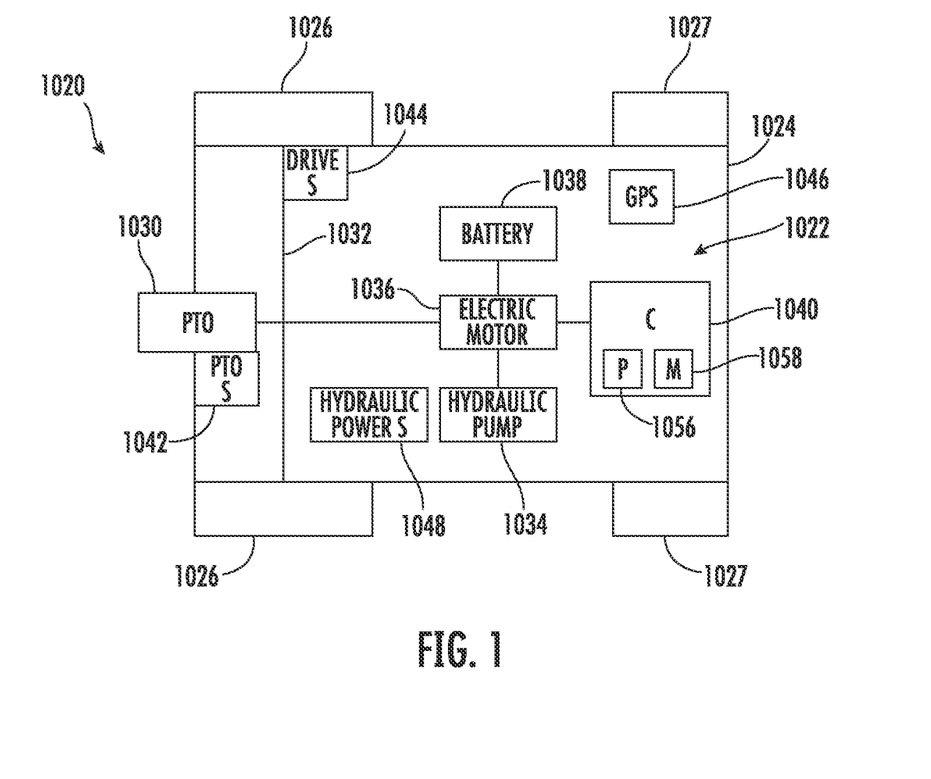
FIG. 1 is a diagram schematically illustrating portions of an example image motor output control system.

FIG. 1 is a diagram schematically illustrating portions of an example electric vehicle 1020 having an example motor output control system 1022. Vehicle 1020 comprises a self-propelled vehicle driven by an electric motor. Vehicle 1020 comprises frame 1024 rotatably supporting rear driven traction members 1026 and front traction members 1027. Vehicle 1020 further comprises various example powerline components comprising power takeoff 1030, vehicle drive system 1032, and hydraulic 1034. Vehicle 1020 comprises an electric motor 1036 which receives electrical power from battery 1038 and which outputs torque to drive each of the powerline components 1030, 1032 and 1034.

Motor output control system 1022 provides enhanced protection for powerline components of a vehicle by reducing, increasing and/or limiting the output of the electric motor 1036 based upon the current monitored outputs (such as torque or power) of the individual powerline components. Motor output control system 1022 comprises controller 1040, PTO sensor 1042, drive sensor 1044, global positioning satellite (GPS) system 1046 and hydraulic power sensor 1048. Controller 1040 comprises processing unit 1056 and memory 1058. Memory 1058 comprises a non-transitory computer-readable medium containing instructions configured to direct processing unit 1056 to adjust the output of electric motor 1036 based upon the current estimated output (torque and/or power) of the individual powerline components.

PTO sensor 1042 comprises sensor configured to sense the (current output (torque and/or power) of PTO 1030. In some implementations, PTO sensor 1042 may be omitted, wherein the output of PTO 1030 is determined by subtracting the determined or estimated output of vehicle drive system 1032 and hydraulic pump 1034 from the current total output of electric motor 1036. In circumstances where the motor is powering other powerline components, the determined/estimated output of such other powerline components would also be subtracted from the total output of electric motor 1036 when determining/estimating the output of PTO 1030.

Drive sensor 1044 comprises a sensor configured to detect the current output (torque and/or power) of vehicle drive system 1032. Vehicle drive system 1032 may comprise a transmission for transmitting power from electric motor 1036 to the driven traction members 1026, which may be wheels or tracks. In such implementations, drive sensor 1044 may comprise a wheel encoder.

Hydraulic pump sensor 1048 comprises a sensor configured to detect the output (power and/or torque) of hydraulic pump 1034. In some implementations, hydraulic power sensor 1048 may comprise a sensor that outputs signals indicating at least one of a hydraulic output pressure and a hydraulic flow rate of hydraulic pump 1034. Such control signals may be utilized by controller 1040 to determine or estimate the current hydraulic output by the hydraulic pump 1034.

Figure 2:
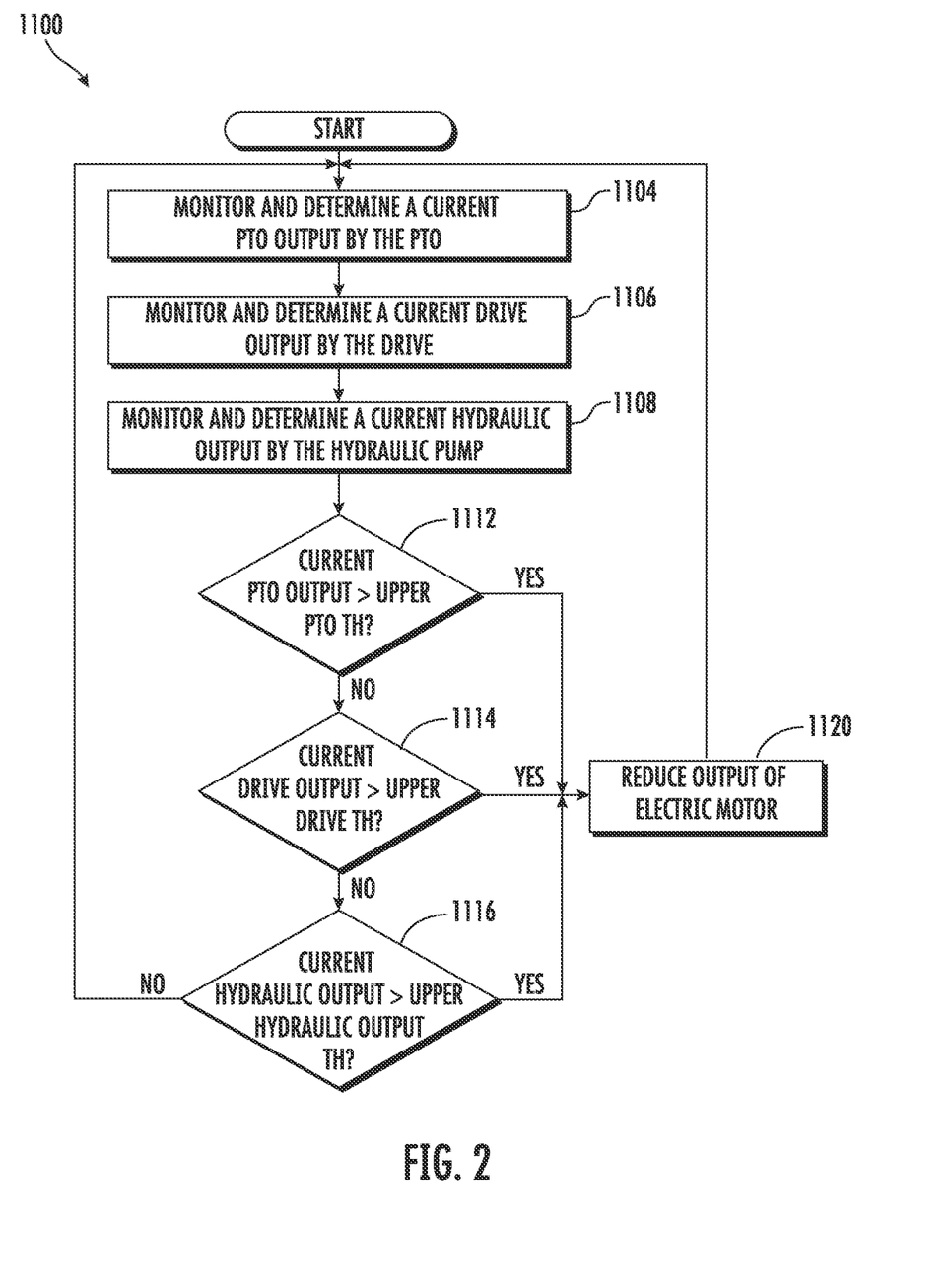
FIG. 2 is a flow diagram of an example motor output control method.

FIG. 2 is a flow diagram illustrating one example method 1100 that may be carried out by processing unit 1056 following instructions contained in memory 1058. As indicated by block 1104, controller 1040 (the processor 1056 following instructions in memory 1058) continually or periodically monitors and determines a current PTO output by PTO 1030. As discussed above, in some implementations, this may involve receiving signals from PTO sensor 1042 and determining the current PTO output based thereon. In some implementations, this may involve obtaining the current output electric motor 1036 and subtracting the determiner estimated output of the other powerline components also receiving torque or power from electric motor 1036.

As indicated by block 1106, controller 1040 continually or periodically monitors and determines a current drive output by vehicle drive system 1032. The drive output may be determined based upon signals encoder or based upon the rate at which the vehicle is traveling based upon signals from GPS 1046. In other implementations, controller 1040 may determine/estimate the current drive output by vehicle drive system 1032 based upon signals from other drive sensors.

As indicated by block 1108, controller 1040 continuously periodically monitors and determines/estimates the current hydraulic output by the hydraulic pump 1034. As discussed above, the hydraulic output may be determined based on signals from hydraulic power sensor 1048. Hydraulic power sensor 1048 may comprise pressure and/or a hydraulic flow rate of the hydraulic pump 1034.

As indicated by block 1112, controller 1040 determines whether the current PTO output determined in block 1104 exceeds an upper PTO threshold. The upper PTO threshold may be a threshold which, when exceeded, may present a risk of damage to the PTO 1030 or to components connected to PTO 1030.

As indicated by block 1114, controller 1040 determines whether the current vehicle drive system output by the drive 1032, determined in block 1106, exceeds an upper drive threshold. The upper drive threshold may be a threshold which, when exceeded, may present a risk of damage to the drive 1032 or to components connected to the drive 1032.

As indicated by block 1116, controller 1040 determines whether hydraulic output by the hydraulic pump, determined in block 1108, exceeds an upper hydraulic output threshold. The upper hydraulic output threshold may be a threshold which, when exceeded, may present a risk of damage to the hydraulic pump 1034 or to components that receive pressurized hydraulic fluid from the hydraulic pump 1034.

As indicated by block 1120, in response to at least one of the current PTO output exceeding the upper PTO threshold (per block 1112), the current vehicle drive system output exceeding the upper drive threshold (per block 1114) and the current hydraulic output exceeding the upper hydraulic output threshold (per block 1116), controller 1040 outputs control signals to electric motor, or to the battery 1038 supplying electrical charge to the electric motor 1036, to reduce the output of the electric motor 1036. In some implementations, the output may be iteratively and incrementally reduced until each of the upper PTO threshold, the upper drive threshold and the upper hydraulic power threshold are not exceeded.

Figure 3:
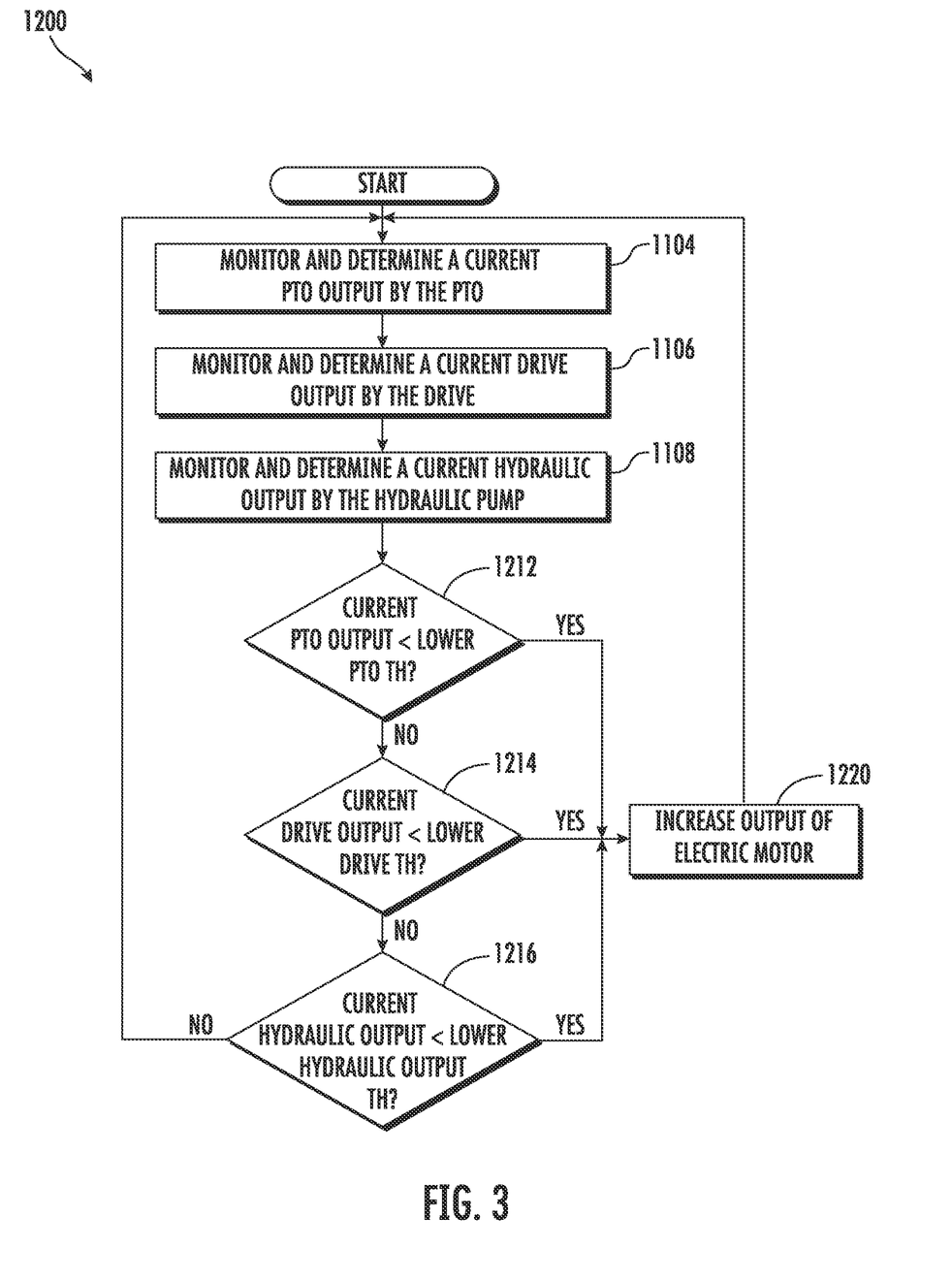
FIG. 3 is a flow diagram of an example motor output control method.

FIG. 3 is a flow diagram illustrating an example method 1200 that may be carried out by processor 1056 following instructions contained in memory 1058. Method 1200 is similar to method 1100 described above except that method 1200 comprises blocks 1212, 1214, 1216 and 1220 in place of blocks 1112, 1114, 1116 1120, respectfully. Method 1200 addresses circumstances where the current PTO output is less than a predetermined lower PTO threshold, where the current vehicle drive system output is less than a predetermined lower drive threshold or where the current hydraulic output is less than the predetermined lower hydraulic output threshold. In block 1220, rather than reducing the output of the electric motor per block 1120 described above, controller 1040 increases the output of the electric motor 1036. Such incrementing may be iteratively performed until the lower thresholds of each of the current PTO output, current vehicle drive system output and the current hydraulic output all satisfy their respective minimum or lower thresholds. As with method 1100, method 1200 may monitor less than each of the three operational states: (1) current PTO output; (2) current vehicle drive system output; and (3) current hydraulic output when evaluating when and how to adjust the output of electric motor 1036.

In some implementations, the controller 1040 automatically adjusts the output by the electric motor 1036 based upon a combination of both a sensed or determined torque and a sensed power output of at least one powerline component (by at least one of PTO 1030, vehicle drive system 1032 and hydraulic pump 1034). For example, the controller 1040 may automatically adjust output of the electric motor 1036 in response to a combination of the determined torque and sensed power output of a powerline component 1030, 1032, 1034 (or a combination thereof) falling below a predetermined lower threshold or rising above a predetermined upper threshold, the lower threshold and the upper threshold both being established based upon a combination of torque and power output values that may damage the particular powerline component (or at least one powerline component of a group of powerline components).

In some implementations, the determined torque value and the sensed power output by the at least one powerline component 1030, 1032, 1034 may be differently weighted. For example, the determined torque value of one or more of the powerline components may have a greater impact upon whether the controller 1040 proceeds with automatically adjusting the power output by the electric motor 1036. In other implementations, the sensed power output by the one or more powerline components 1030, 1032, 1034 may have a greater impact upon whether the controller 1040 proceeds with automatically adjusting the power output by the electric motor 1036.

In implementations where the output (torque and/or power output) of more than one powerline component 1030, 1032, 1034 is used by controller 1040 to determine whether to automatically adjust the output of the electric motor 1036, the output of the different powerline components may be differently weighted. Particular powerline components may be more expensive to repair or replace. Particular powerline components may be more susceptible to damage or may be more susceptible to more serious damage as compared to other powerline components.

The output of those powerline components that are more expensive to repair or replace, that are more susceptible to damage or that are more susceptible to more serious damage may be given a greater weight by controller 1040 when combined with the output of other powerline components to be compared to a predetermined lower or upper output threshold to determine whether to automatically adjust the output of electric motor 1036. For example, in response to Powerline Component Output A*0.5+Powerline Output B*0.3+Powerline Component OutputC*0.2>upper output threshold, the controller 1040 may automatically reduce the output of the electric motor 1036, wherein the 0.5, the 0.3 and 0.2 are different weights applied to the different determined or sensed outputs of the powerline components when controller 1040 is determining whether to automatically reduce the output of electric motor.

The sensed or determined output of different powerline components may be differently weighted depending upon whether the combined values are being compared against an upper threshold or a lower threshold. For example, in the same implementation, in response to Powerline Component Output A*0.4+Powerline Output B*0.5+Powerline Component OutputC*0.5>lower output threshold, the controller 1040 may automatically increase the output of the electric motor 1036, wherein the 0.4, the 0.4 and 0.4 are different weights applied to the different determined or sensed outputs of the powerline components when controller 1040 is determining whether to automatically increase the output of the electric motor. In some implementations, the different weights applied to the different powerline components by controller 1040 may be the same when controller 1040 is determining the combined values against an upper threshold to determine whether to lower the output of electric motor or a lower threshold to determine whether to increase the output of the electric motor.

Figure 4:
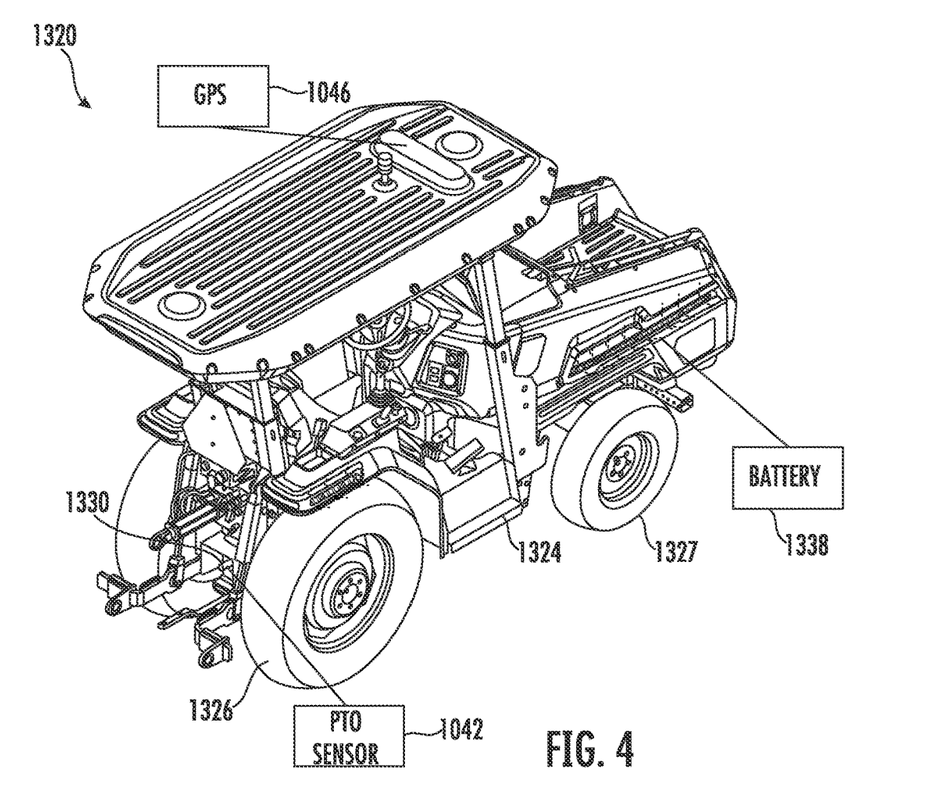
FIG. 4 is a rear perspective view illustrating portions of an example motor output control system.
Figure 5:
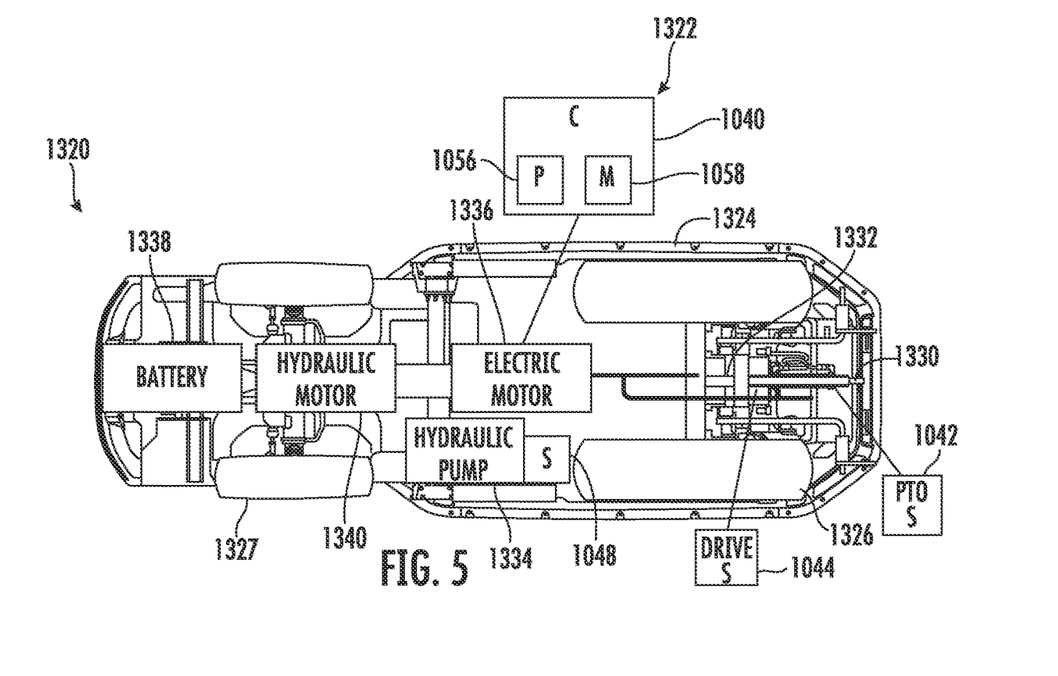
FIG. 5 is a bottom view of the example motor output control system of FIG. 4.

FIGS. 4 and 5 illustrate portions of an example vehicle 1320 which comprises an example motor output control system 1322. Vehicle 1320 and system 1322 are one example implementation of the vehicle 1020 and system 1022 described above with respect to FIG. 15. Vehicle 1320 and system 1322 may carry out the motor output control methods 1100 and 1200 described above with respect to Figures to and 3, respectively. Vehicle 1320 comprises a self-propelled vehicle driven in the form of a tractor by an electric motor. Vehicle 1320 comprises frame 1324 rotatably supporting rear driven traction members 1326 and front traction members 1327. Vehicle 1320 further comprises various example powerline components comprising power takeoff 1330, vehicle drive system 1332, and hydraulic pump 1334. The vehicle drive system 1332 and the hydraulic pump 1334 are schematically illustrated in FIG. 5. Vehicle 1320 comprises an electric motor 1336 which receives electrical power from battery 1338 and which outputs torque to drive each of the powerline components 1330, 1332 and 1334.

In the example illustrated, the hydraulic pump 1334 a supply hydraulic fluid, under pressure, to drive a hydraulic motor 1340 which is operably coupled to front traction members 1327 to provide front wheel drive and such or to control the lead of vehicle 1320. Hydraulic pump 1334 may additionally supply hydraulic fluid, under pressure, and various other hydraulic actuators, such as hydraulic cylinder-piston assemblies, or external devices that are hydraulically driven.

Motor output control system 1322 provides enhanced protection for powerline components of a vehicle by reducing, increasing and/or limiting the output of the electric motor 1336 based upon the current monitored outputs (such as torque or power) of the individual powerline components. Motor output control system 1322 comprises controller 1040, PTO sensor 1042, drive sensor 1044, global positioning satellite (GPS) system 1046 and hydraulic power sensor 1048. Controller 1040 comprises processing unit 1056 and memory 1058. Memory 1058 comprises a non-transitory computer-readable medium containing instructions configured to direct processing unit 1056 to adjust the output of electric motor 1036 based upon the current estimated output (torque and/or power) of the individual powerline components.

PTO sensor 1042 comprises sensor configured to sense the (current output (torque and/or power) of PTO 1030. In some implementations, PTO sensor 1042 may be omitted, wherein the output of PTO 1330 is determined by subtracting the determined or estimated output of vehicle drive system 1332 and hydraulic pump 1334 from the current total output of electric motor 1336 1036. In circumstances where the motor is powering other powerline components, the determined/estimated output of such other powerline components would also be subtracted from the total output of electric motor 1336 when determining/estimating the output of PTO 1330.

Drive sensor 1044 comprises a sensor configured to detect the current output (torque and/or power) of vehicle drive system 1332. Vehicle drive system 1332 may comprise a transmission for transmitting power from electric motor 1336 to the driven traction members 1326, which may be wheels or tracks. In some implementations, drive sensor 1044 may comprise a wheel encoder.

Hydraulic pump sensor 1048 comprises a sensor configured to detect the output (power and/or torque) of hydraulic pump 1034. In some implementations, hydraulic power sensor 1048 may comprise a sensor that outputs signals indicating at least one of a hydraulic output pressure and a hydraulic flow rate of hydraulic pump 1334. Such control signals may be utilized by controller 1040 to determine or estimate the current hydraulic output by the hydraulic pump 1334.

As set forth above with respect to methods 1100 and 1200, controller 1040 continually or periodically monitors and determines a current drive output by vehicle drive system 1332. The drive output may be determined based upon signals encoder or based upon the rate at which the vehicle 1320 is traveling based upon signals from GPS 1046. In other implementations, controller 1040 may determine/estimate the current drive output by vehicle drive system 1332 based upon signals from other drive sensors. Controller 1040 determines whether the current vehicle drive system output by the drive 1032 exceeds an upper drive threshold. The upper drive threshold may be a threshold which, when exceeded, may present a risk of damage to the drive 1332 or to components connected to the drive 1332.

Controller 1040 continuously or periodically monitors and determines/estimates the current hydraulic output by the hydraulic pump 1334. As discussed above, the hydraulic output may be determined based on signals from hydraulic power sensor 1048. The hydraulic power sensor 1048 may indicate the output of hydraulic pump 1334 by sensing the flow rate of the hydraulic fluid being output by pump 1334 and/or the pressure of the hydraulic fluid being output by pump 1334 Controller 1040 determines whether hydraulic output by the hydraulic pump exceeds an upper hydraulic output threshold. The upper hydraulic output threshold may be a threshold which, when exceeded, may present a risk of damage to the hydraulic pump 1334 or to components that receive pressurized hydraulic fluid from the hydraulic pump 1034.

Controller 1040 continuously or periodically monitors and determines/estimates the current output of PTO 1330 based upon signals from PTO sensor 1042. PTO sensor 1042 may comprise a sensor configured to sense the torque and/or rotation speed of the PTO 1330. Controller 1040 determines whether the current PTO output exceeds an upper PTO threshold. The upper PTO threshold may be a threshold which, when exceeded, may present a risk of damage to the PTO 1330 or to components connected to PTO 1330.

In response to at least one of the current PTO output exceeding the upper PTO threshold, the current vehicle drive system output exceeding the upper drive threshold and the current hydraulic output exceeding the upper hydraulic output threshold, controller 1040 outputs control signals to electric motor 1336, or to the battery 1338 supplying electrical charge to the electric motor 1336, to reduce the output of the electric motor 1336. In some implementations, the output may be iteratively and incrementally reduced until each of the upper PTO threshold, the upper drive threshold and the upper hydraulic power threshold are not exceeded.

As discussed above, in some implementations, the controller 1040 automatically adjusts the output by the electric motor 1336 based upon a combination of both a sensed or determined torque and a sensed power output of at least one powerline component (by at least one of PTO 1330, vehicle drive system 1332 and hydraulic pump 1334). In some implementations, the determined torque value and the sensed power output by a powerline component 1330, 1332, 1334 may be differently weighted. In implementations where the output (torque and/or power output) of more than one powerline component 1330, 1332, 1334 is used by controller 1040 to determine whether to automatically adjust the output of the electric motor 1336, the output of the different powerline components may be differently weighted.

Although the claims of the present disclosure are generally directed to a controller that (1) monitors and determines a current output of the at least one powerline component; and (2) automatically outputs control signals adjusting output by the electric motor based upon an output of the at least one powerline component, the present disclosure is additionally directed to the features set forth in the following definitions.

Definition 1. A motor output control system comprising:
an electric motor;
a power take off (PTO) powered by the electric motor;
a vehicle drive system powered by the electric motor;
a hydraulic pump powered by the electric motor; and
a controller configured to:
monitor and determine a current PTO output by the PTO;
monitor and determine a current drive output by the vehicle drive system;
monitor and determine a current hydraulic output by the hydraulic pump; and
automatically output control signals reducing output by the electric motor in response to at least one of (a) the current PTO output exceeding an upper PTO threshold, (b) the current drive output exceeding an upper drive threshold, and (c) the current hydraulic output exceeding an upper hydraulic output threshold.

Definition 2. The system of Definition 1 further comprising a PTO sensor to output PTO speed signals indicating a speed of the PTO, wherein the controller monitors the PTO speed signals to determine the current PTO output by the PTO.

Definition 3. The system of Definition 1 further comprising a drive sensor to output signals indicating a torque of the vehicle drive system, wherein the controller monitors signals from the drive sensor to determine the current drive output by the vehicle drive system.

Definition 4. The system of Definition 3, wherein the drive sensor comprises at least one of a global positioning satellite (GPS) system and a vehicle speed sensor.

Definition 5. The system of Definition 1 further comprising a hydraulic power sensor to output signals indicating at least one of a hydraulic output pressure and a hydraulic flow rate of the pump, wherein the controller monitors signals from the hydraulic power sensor to determine the current hydraulic output by the hydraulic pump.

Definition 6. The system of Definition 1 further comprising:
a drive sensor to output signals indicating a torque of the vehicle drive system, wherein the controller monitors signals from the drive sensor to determine the current drive output by the vehicle drive system; and
a hydraulic power sensor to output signals indicating at least one of a hydraulic output pressure and a hydraulic flow rate of the pump, wherein the controller monitors signals from the hydraulic power sensor to determine the current hydraulic output by the hydraulic pump,
wherein the controller is configured to determine the current PTO power by the PTO based upon a total output by the electric motor, the current drive output by the vehicle drive system and the current hydraulic output by the hydraulic pump.

Definition 7. The system of Definition 1, wherein the controller is configured to iteratively and incrementally reduce output by the electric motor until each of the upper PTO threshold, the upper drive threshold and the upper hydraulic power threshold are not exceeded.

Definition 8. The system of Definition 1, wherein the current PTO output, the current drive output, and the current hydraulic output each comprises at least one of power and torque.

Definition 9. The system of Definition 1, wherein the output by the electric motor that is reduced comprises at least one of power and torque.

Definition 10. The system of Definition 1, wherein the controller is configured to automatically output control signals increasing output by the electric motor in response to at least one of (a) the current PTO output falling below a lower PTO threshold, (b) the current drive output falling below a lower drive threshold, and (c) the current hydraulic output falling below a lower hydraulic output threshold.

Definition 11. The system of Definition 13, wherein the controller is configured to iteratively and incrementally increase output by the electric motor until each of the lower PTO threshold, the lower drive threshold and the lower hydraulic power threshold are satisfied or exceeded.

Definition 12. A motor output control system comprising:
an electric motor;
a power take off (PTO) powered by the electric motor
a vehicle drive system powered by the electric motor; and
a controller configured to:
monitor and determine a current PTO output by the PTO;
monitor and determine a current drive output by the vehicle drive system; and
automatically output control signals reducing output by the electric motor in response to at least one of (a) the current PTO output exceeding a PTO threshold, and (b) the current vehicle drive system output exceeding a drive threshold.

Definition 13. A motor output control system comprising:
an electric motor;
at least one powerline component driven by the electric motor, and
a controller configured to:
monitor and determine a current output of the at least one powerline component; and
automatically output control signals reducing output by the electric motor in response to the current output of the at least one powerline component exceeding a corresponding upper output threshold.

Definition 14. A motor output control system comprising:
an electric motor;
at least one powerline component driven by the electric motor, and
a controller configured to:
monitor and determine a current output of the at least one powerline component; and
automatically output control signals increasing output by the electric motor in response to the current output of the at least one powerline component failing to satisfy a corresponding lower output threshold.

Definition 15. A motor output control system comprising:
an electric motor;
at least one powerline component driven by the electric motor, and a controller configured to:
monitor and determine a current torque and a current power output of the at least one powerline component; and
automatically output control signals adjusting output by the electric motor in response to a combination of a first weighting of the current torque and a second different weighting of the current power output failing to satisfy a combined torque and power threshold.

Although the present disclosure has been described with reference to example implementations, workers skilled in the art will recognize that changes may be made in form and detail without departing from the scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A motor output control system comprising:
an electric motor;
at least one powerline component powered by the electric motor; and
a controller to:
monitor and determine a current output of the at least one powerline component; and
automatically output control signals adjusting output by the electric motor based upon an output of the at least one powerline component.

2. The motor output control system of claim 1, wherein the at least one powerline component is selected from a group of powerline components consisting of: a power take off (PTO) powered by the electric motor; a vehicle drive system powered by the electric motor; and a hydraulic pump powered by the electric motor.

3. The motor output control system of claim 1, wherein the at least one powerline component comprises a first powerline component and a second powerline component, wherein the controller is configured to monitor and determine a first current output of the first powerline component and a second current output of the second powerline component and wherein the controller is configured to automatically output control signals adjusting output by the electric motor based upon the first current output and the second current output.

4. The motor output control system of claim 3, wherein the controller is configured to differently weight the first current output and the second current output when determining whether to automatically output control signals to adjust output by the electric motor.

5. The motor output control system of claim 1, wherein the controller is controller configured to:
monitor and determine a current PTO output by a PTO;
monitor and determine a current drive output by a vehicle drive system;
monitor and determine a current hydraulic output by a hydraulic pump; and
automatically output control signals adjusting output by the electric motor in response to at least one of (a) the current PTO output satisfying a PTO threshold, (b) the current drive output satisfying a drive threshold, and (c) the current hydraulic output satisfying a hydraulic output threshold.

6. The system of claim 5 further comprising a PTO sensor to output PTO speed signals indicating a speed of the PTO, wherein the controller monitors the PTO speed signals to determine the current PTO output by the PTO.

7. The system of claim 5 further comprising a drive sensor to output signals indicating a torque of the vehicle drive system, wherein the controller monitors signals from the drive sensor to determine the current drive output by the vehicle drive system.

8. The system of claim 7, wherein the drive sensor comprises at least one of a global positioning satellite (GPS) system and a vehicle speed sensor.

9. The system of claim 5 further comprising a hydraulic power sensor to output signals indicating at least one of a hydraulic output pressure and a hydraulic flow rate of the pump, wherein the controller monitors signals from the hydraulic power sensor to determine the current hydraulic output by the hydraulic pump.

10. The system of claim 5 further comprising:
a drive sensor to output signals indicating a torque of the vehicle drive system, wherein the controller monitors signals from the drive sensor to determine the current drive output by the vehicle drive system; and
a hydraulic power sensor to output signals indicating at least one of a hydraulic output pressure and a hydraulic flow rate of the pump, wherein the controller monitors signals from the hydraulic power sensor to determine the current hydraulic output by the hydraulic pump,
wherein the controller is configured to determine the current PTO power by the PTO based upon a total output by the electric motor, the current drive output by the vehicle drive system and the current hydraulic output by the hydraulic pump.

11. The system of claim 5, wherein the PTO threshold comprises an upper PTO threshold, wherein the drive threshold comprises an upper drive threshold and wherein the hydraulic output threshold comprises an upper hydraulic output threshold and wherein the controller is configured to iteratively and incrementally reduce output by the electric motor until each of the upper PTO threshold, the upper drive threshold and the upper hydraulic output threshold are not exceeded.

12. The system of claim 5, wherein the current PTO output, the current drive output, and the current hydraulic output each comprises at least one of power and torque.

13. The system of claim 5, wherein the output by the electric motor that is determined comprises at least one of power and torque.

14. The system of claim 5, wherein the PTO threshold comprises a lower PTO threshold, wherein the drive threshold comprises a lower drive threshold and wherein the hydraulic output threshold comprises a lower hydraulic output threshold and wherein the controller is configured to automatically output control signals increasing output by the electric motor in response to at least one of (a) the current PTO output falling below the lower PTO threshold, (b) the current drive output falling below the lower drive threshold, and (c) the current hydraulic output falling below the lower hydraulic output threshold.

15. The motor output control system of claim 1, wherein the controller is configured to:
   monitor and determine a current torque and a current power output of the at least one powerline component; and
   automatically output control signals adjusting output by the electric motor in response to a combination of a first weighting of the current torque and a second different weighting of the current power output failing to satisfy a combined torque and power threshold.

16. The motor output control system of claim 1, further comprising a vehicle comprising the electric motor and the at least one powerline component, the at least one powerline component comprising a power take off, a vehicle drive system and a hydraulic pump.

17. The motor output control system of claim 16, wherein the vehicle carries the controller.

18. A motor output control method comprising:
   monitoring and determining a current output of the at least one powerline component; and
   automatically outputting control signals adjusting output by the electric motor based upon an output of the at least one powerline component.

19. The motor output control method of claim 18, wherein the at least one powerline component is selected from a group of powerline components consisting of: a power take off (PTO) powered by the electric motor; a vehicle drive system powered by the electric motor; and a hydraulic pump powered by the electric motor.

20. The motor output control method of claim 19, wherein the at least one powerline component comprises a first powerline component and a second powerline component, wherein the controller is configured to monitor and determine a first current output of the first powerline component and a second current output of the second powerline component and wherein the controller is configured to automatically output control signals adjusting output by the electric motor based upon the first current output and the second current output.

* * * * *